(12) United States Patent
Robertson et al.

(10) Patent No.: US 11,125,873 B1
(45) Date of Patent: Sep. 21, 2021

(54) USING RADAR SENSORS FOR COLLISION AVOIDANCE

(71) Applicant: Fortem Technologies, Inc., Pleasant Grove, UT (US)

(72) Inventors: Adam Eugene Robertson, Provo, UT (US); Matthew Robertson Morin, Orem, UT (US); Bryan Alan Davis, Salt Lake City, UT (US); Bruce Alexander Carpenter, Park City, UT (US); Matthew Elliott Argyle, Lindon, UT (US); James David Mackie, Provo, UT (US); Eric Richard Grover, Pleasant Grove, UT (US); Brandon Robert Hicks, Saratoga Springs, UT (US); David Preece, Elk Ridge, UT (US); Mikko Valimaki, Orem, UT (US)

(73) Assignee: FORTEM TECHNOLOGIES, INC., Pleasant Grove, UT (US)

( * ) Notice: Subject to any disclaimer, the term of this patent is extended or adjusted under 35 U.S.C. 154(b) by 295 days.

(21) Appl. No.: 16/137,008

(22) Filed: Sep. 20, 2018

Related U.S. Application Data

(60) Provisional application No. 62/560,754, filed on Sep. 20, 2017.

(51) Int. Cl.
*G01S 13/93* (2020.01)
*G01S 13/933* (2020.01)
(Continued)

(52) U.S. Cl.
CPC .......... *G01S 13/933* (2020.01); *G01S 7/2813* (2013.01); *G01S 7/411* (2013.01); *G01S 2013/0272* (2013.01)

(58) Field of Classification Search
CPC .......... G01S 13/933; G01S 2013/0272; G01S 7/2813; G01S 7/411; H01Q 3/06; H01Q 3/26
See application file for complete search history.

(56) References Cited

U.S. PATENT DOCUMENTS 4,291,310 A * 9/1981 Kruger ................. H01Q 3/2617
342/156
4,317,119 A * 2/1982 Alvarez ................ G01S 13/933
342/455
(Continued)

FOREIGN PATENT DOCUMENTS

CN    205844522 U    12/2016
WO    WO 2016/130495    8/2016

OTHER PUBLICATIONS

Aerotenna, "Aerotenna Releases 360° Sense-and-Avoid Radar, Advances Drones Closer to Autonomous Flight" Oct. 3, 2016.
(Continued)

*Primary Examiner* — Timothy A Brainard

(57) ABSTRACT

Systems, methods, and computer-readable media are described using radar systems to avoid vehicle collisions. An example radar system can include antennas mounted on an aircraft, where each antenna has a different orientation facing a different direction away from the aircraft. The radar system can include one or more processing devices and a computer-readable storage medium storing instructions which, when executed by the one or more processing devices, cause the radar system to coordinate digital beam steering and digital beam forming with the antennas to produce a radar coverage area that includes a portion of an airspace around the aircraft; detect, based a signal transmitted by the antennas using the digital beam steering and digital beam forming, an object within the radar coverage area; and generate collision avoidance information including
(Continued)

an indication of the object detected within the radar coverage area and/or an instruction for avoiding a collision with the object.

20 Claims, 10 Drawing Sheets

(51) Int. Cl.
*G01S 7/41* (2006.01)
*G01S 7/28* (2006.01)
*G01S 13/02* (2006.01)

(56) References Cited

U.S. PATENT DOCUMENTS

| | | | |
|---|---|---|---|
| 5,581,250 | A | 12/1996 | Khvilivitzky |
| 7,443,334 | B2 | 10/2008 | Rees et al. |
| 8,378,881 | B2 | 2/2013 | LeMire et al. |
| 8,494,760 | B2 | 7/2013 | Yoel et al. |
| 2008/0284637 | A1* | 11/2008 | Blessing ............... G01S 13/933 342/30 |
| 2011/0241931 | A1* | 10/2011 | Krich ................... G01S 7/2813 342/159 |
| 2014/0079248 | A1* | 3/2014 | Short ........................ G01S 3/74 381/119 |
| 2014/0204215 | A1* | 7/2014 | Kriel ..................... G01S 13/931 348/159 |
| 2015/0288073 | A1* | 10/2015 | Hall ....................... H01Q 17/00 342/2 |
| 2017/0045613 | A1 | 2/2017 | Wang |
| 2017/0343667 | A1* | 11/2017 | Vacanti ................ G01S 13/953 |
| 2017/0363713 | A1* | 12/2017 | Kim ................... H01Q 21/0075 |
| 2018/0246200 | A1* | 8/2018 | Goossen ................ G01S 19/03 |
| 2019/0064338 | A1* | 2/2019 | Holt ....................... G01S 13/426 |

OTHER PUBLICATIONS

Young K. Kwag et al., "UAV base Collision Avoidance Radar Sensor" 2007 IEEE, p. 639-642.

Joongbo Seo et al., "Collision Avoidance Strategies for Unmanned Aerial Vehicles in Formation Flight", IEEE Transactions on Aerospace and Electronic Systems, 0018-9251(c) 2016 IEEE.

Ming-Chang Wen, "Augmented Reality and Unmanned Aerial Vehicle Assist in Construction Management", Computing in Civil and Building Engineering, ASCE 2014.

* cited by examiner

USING RADAR SENSORS FOR COLLISION AVOIDANCE

CROSS-REFERENCE TO RELATED APPLICATIONS

This application claims the benefit of, and priority to, U.S. Provisional Patent Application No. 62/560,754 filed on Sep. 20, 2017, entitled "USING RADAR SENSORS FOR COLLISION AVOIDANCE", the contents of which are hereby expressly incorporated by reference in their entirety.

TECHNICAL FIELD

The present technology pertains to radar systems, and more specifically to using radar sensors for vehicle collision avoidance.

BACKGROUND

The widespread adoption of aircrafts, drones and other airborne vehicles has created congested airspaces, increasing the risks of airspace collisions and the difficulty of managing airspace traffic. The emergence and increasing popularity of drone technologies and unmanned aerial vehicles (UAVs) have increased the number and type of obstacles in airspaces, thus further complicating airspace management and increasing the risk of collisions. Moreover, the growing availability and use of UAVs, such as drones, for civilian and other applications has further exacerbated these problems and created new flight risks and challenges. The lack of accurate, efficient, and adequate means by many aircrafts for detecting airspace objects and avoiding collisions is a major problem for governments, citizens, and communities.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only example implementations of the disclosure and are not therefore to be considered to be limiting of its scope, the principles herein will be described and explained with additional specificity and detail through the use of the accompanying drawings in which.

DETAILED DESCRIPTION

Figure 1A:
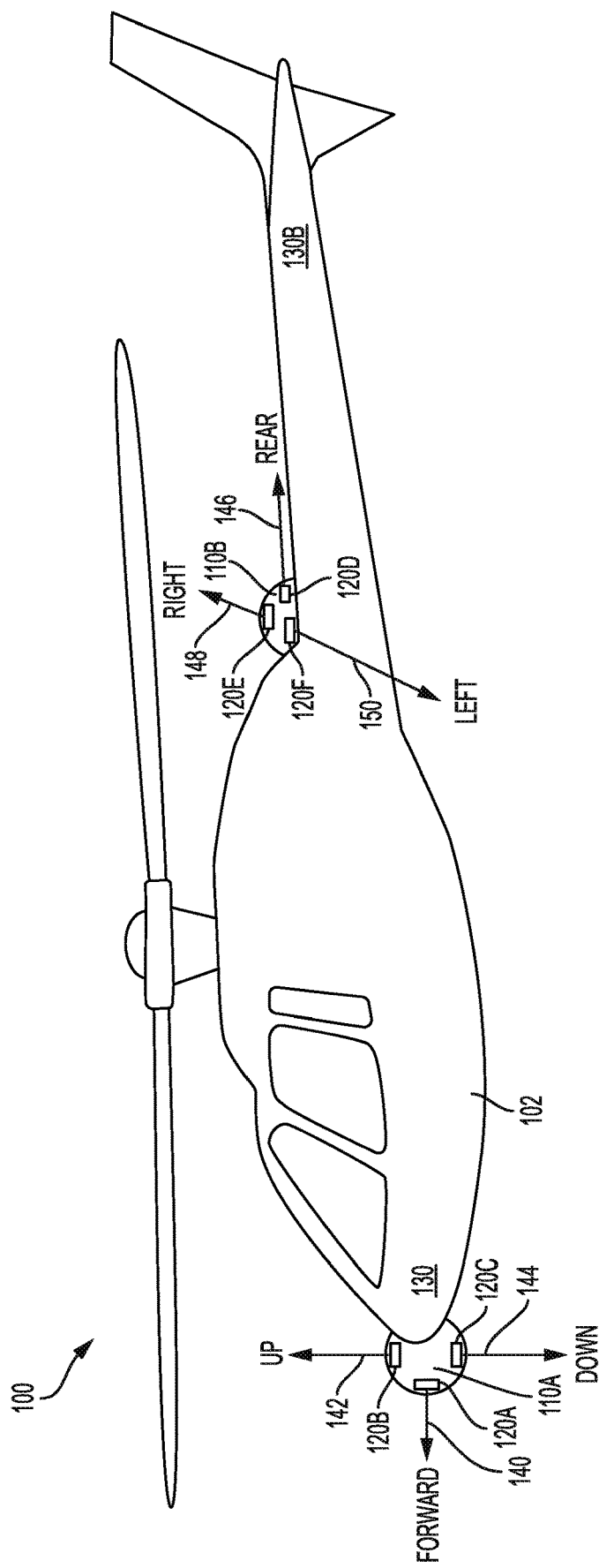
FIG. 1A illustrates an aircraft implementing radar antennas according to an example aircraft radar configuration, in accordance with various embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description.

References to one or an embodiment in the present disclosure can refer to the same embodiment or any disclosed embodiment. For example, reference to "one embodiment", "an embodiment" or "some embodiments" means that any features, concepts, structures, and/or characteristics described in connection with such embodiment(s) are included in at least such embodiment(s) of the disclosure, but are not limited to such embodiment(s) and can indeed be included in any other embodiment(s) of the disclosure. The appearances of the phrases "in one embodiment", "in an embodiment" or "in some embodiments" in various places in the disclosure are not necessarily all referring to the same embodiment(s), nor are separate or alternative embodiments mutually exclusive of other embodiments.

The terms used in this specification generally have their ordinary meanings in the art, within the context of the disclosure, and in the specific context where each term is used. Unless otherwise defined, technical and scientific terms used herein have the meaning as commonly understood by one of ordinary skill in the art to which this disclosure pertains. In the case of conflict, the present document, including definitions and description will control.

Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms.

The use of examples anywhere in this specification including examples of any terms discussed herein is illustrative only, and is not intended to further limit the scope and meaning of the disclosure or of any example term. Note that titles or subtitles may be used in the examples for convenience of a reader, which in no way should limit the scope of the disclosure.

Without intent to limit the scope of the disclosure, examples of instruments, apparatus, methods and their related results according to embodiments of the present disclosure are given below. However, the disclosure is not limited to the examples or embodiments described in this specification. Additional features and advantages of the disclosure will be set forth in the description which follows, and in part will be obvious from the description, or can be learned by practice of the principles disclosed herein. The features and advantages of the disclosure can be realized and obtained by means of the instruments, elements and techniques particularly pointed out in the appended claims. These and other features of the disclosure will become more fully apparent from the following description and appended claims, and/or can be learned by the practice of the principles set forth herein.

Overview

Systems, methods, and computer-readable media are described for using radar systems to avoid vehicle collisions. In some implementations, a radar system is provided for detecting objects and avoiding collisions with the objects. The radar system can include a plurality of antennas mounted on an aircraft, where each of the plurality of antennas has a different orientation (e.g., forward, up, down, rear, right, left, diagonal, etc.) facing a different direction away from the aircraft.

The radar system can also include one or more processing devices and at least one computer-readable storage medium storing instructions which, when executed by the one or more processing devices, cause the radar system to coordinate digital beam steering and digital beam forming with one or more of the plurality of antennas to produce a radar coverage area (e.g., an area covering at least a portion of an airspace around the aircraft) associated with the plurality of antennas; based on one or more signals transmitted by the one or more of the plurality of antennas using the digital beam steering and digital beam forming; detect one or more objects (e.g., other aircrafts, animals, buildings, airborne objects, mountains, etc.) within the radar coverage area; and generate collision avoidance information including an indication of the one or more objects detected within the radar coverage and/or an instruction for avoiding a potential collision by the aircraft with the one or more objects.

In some cases, the radar system can provide the collision avoidance information to an operator of the aircraft (if manned) and/or a computing system in the aircraft, such as an autopilot or control system. The operator and/or the computing system can use the collision avoidance information to make flight adjustments for avoiding a collision with the one or more objects, such as changing a flight path, an elevation, a velocity, etc. In some cases, the operator and/or the computing system can use the collision avoidance information to maneuver around the one or more objects, communicate with the one or more objects, attempt to remove the one or more objects from a path of the aircraft, etc.

In some implementations, a method is provided for using a radar system to detect objects and avoid collisions with the objects. The method can include mounting a plurality of antennas on an aircraft, where each of the plurality of antennas is mounted in a different orientation facing a different direction away from the aircraft; coordinating digital beam steering and digital beam forming with one or more of the plurality of antennas to produce a radar coverage area associated with the plurality of antennas; detecting, based on one or more signals transmitted by the one or more of the plurality of antennas using the digital beam steering and digital beam forming, one or more objects within the radar coverage area; and generating collision avoidance information including an indication of the one or more objects detected within the radar coverage and/or an instruction for avoiding a potential collision by the aircraft with the one or more objects.

In other implementations, a non-transitory computer-readable storage medium is provided for using a radar system to detect objects and avoid collisions with the objects. The non-transitory computer-readable storage medium can store instructions which, when executed by one or more radar systems, cause the one or more radar systems to coordinate digital beam steering and digital beam forming with one or more of a plurality of antennas mounted on an aircraft, to produce a radar coverage area associated with the plurality of antennas; receive, based on one or more signals transmitted by the one or more of the plurality of antennas using the digital beam steering and digital beam forming, one or more return signals reflected by one or more objects in the radar coverage area; detect, based on the one or more return signals, the one or more objects in the radar coverage area; and generate collision avoidance information including an indication of the one or more objects detected within the radar coverage and/or an instruction for avoiding a potential collision by the aircraft with the one or more objects.

Each of the plurality of antennas mounted on the aircraft can have a different orientation facing a different direction away from the aircraft. In some cases, the plurality of antennas can be housed in one or more radar devices mounted on the aircraft. The radar devices can be mounted on different locations of the aircraft, such as a front and rear area of the aircraft. The radar devices can also include other electrical components, such as processors, cache elements, switching elements, radio frequency (RF) modulators, circuits, interfaces, memory, etc.

DESCRIPTION OF EXAMPLE EMBODIMENTS

The present technology will be described in the following disclosure as follows. The discussion begins with an introductory discussion of systems and techniques for providing radar coverage around a vehicle to detect other objects and avoid collisions. A discussion of example systems, methods, and techniques for using radar systems for collision avoidance, as shown in FIGS. 1A through 6, will then follow. The discussion concludes with a description of an example computing device architecture, as illustrated in FIG. 7, including example hardware components that can be implemented by a radar system and/or a computing device to perform various computing operations as described herein.

The disclosure now turns to an introductory discussion of systems and techniques for providing radar coverage around a vehicle to detect other objects and avoid collisions.

The approaches herein can be used to provide a wide area of radar coverage (e.g., up to 360 degrees of spherical coverage) around an aircraft, such as an Unmanned Aerial Vehicle (UAV) or a manned aircraft (e.g., a helicopter, an airplane, a hot-air balloon, etc.), to detect other airborne vehicles or objects (e.g., airborne animals, mountains, etc.). The approaches herein can implement radars to detect a variety of objects, including, without limitation, UAVs, other types of aircrafts, airborne animals such as birds, weather, hang-gliders, power lines, terrain, towers, cranes, mountains, hot-air balloons, etc. When an object is detected within a path and/or proximity of an aircraft, the aircraft can perform a maneuver to avoid a collision with the object.

For example, the aircraft can detect an object, foresee a collision, and maneuver around the object (e.g., change directions to go under, above, or around the object) to avoid a collision with the object. As another example, depending on the characteristics of the object (e.g., the size, shape, speed, etc.), the aircraft can deploy a device to redirect or remove the object from the aircraft's path to avoid a collision with the object without necessarily maneuvering around the object or changing course.

In some cases, radar returns can be fed into an augmented reality (AR) system for a vehicle operator, such as a UAV operator. The AR system can provide the operator visibility into the path of the aircraft and/or any detected objects within the path and/or a surrounding area of the aircraft. The operator can use this information (e.g., visibility) to make collision avoidance decisions and/or manage the operation of the aircraft accordingly.

In some cases, a plurality of antennas, which can be included in one or more radar devices, can be positioned on (e.g., mounted or attached to, installed or deployed on, etc.) an aircraft and aimed or pointed at various different directions to provide a wide area of radar coverage. For example, various antennas can be mounted on an aircraft and configured to provide 360 degrees of spherical coverage around the aircraft based on, for example, the number and/or positioning of the antennas, the degrees of azimuth of the antennas, the degrees of elevation of the antennas, etc. Using the various antennas, the aircraft can detect objects within the radar coverage area around the aircraft (e.g., up to 360 degrees of spherical coverage) and avoid such objects to prevent colliding with the objects.

In some examples, each antenna can have approximately 120 degrees of azimuth and 120 degrees of elevation. As such, a number of radar antennas with 120 by 120 degrees of coverage can be used to provide 360 degrees of coverage around an aircraft. In some cases, antennas can be used on each axis in a three dimensional space. For example, a radar device including antennas facing forward, left, right, and/or down, can be placed at a front location of an aircraft, such as under the chin of the aircraft. A radar device including antennas facing up, right, left, and/or back can also be placed on a rear location of the aircraft, such as the shoulder, tail, end, etc. In some examples, six antennas can be implemented to provide 360 degrees of coverage around the aircraft. However, in other examples, more or less than six antennas can be implemented as described herein.

In some implementations, 180 degrees (e.g., hemispherical) of radar coverage can be provided around an aircraft, such as, for example, when the aircraft is on the ground. The hemispherical coverage can be used to detect other objects and/or airborne vehicles.

The disclosure now turns to FIG. 1A, which illustrates an aircraft 102 implementing a plurality of radar antennas 120A-F (collectively "120") according to an example aircraft radar configuration 100. The aircraft 102 can be any vehicle with flight capabilities (e.g., powered flight, gliding, etc.), such as, without limitation, a helicopter, a UAV, a jet or airplane, a hang glider, a hot air balloon, etc. For example, in some cases, the aircraft 102 can be a rotor-based UAV that includes a plurality of rotors. The rotor-based UAV can use the rotors for lifting, maneuvering, moving, changing orientation (e.g., pitch, roll, and/or yaw), landing, etc.

In the example aircraft radar configuration 100, the aircraft 102 includes radar systems 110A and 110B, which include radar antennas 120. The radar system 110A can be mounted or installed on a first location of the aircraft 102, such as the front, top or bottom of the aircraft 102, and the radar system 120B can be mounted or installed on a second location of the aircraft 102, such as a shoulder of the aircraft 102, a portion of the tail of the aircraft 102, a top or bottom of the aircraft 102, a wing of the aircraft 102, etc. In FIG. 1A, the radar system 110A is mounted or installed on a front area 130A of the aircraft 102, and the radar system 110B is mounted or installed in a rear area 130B of the aircraft 102. The front area 130A can be, for example, near a nose of the aircraft 102 and the rear area 130B can be, for example, near the tail boom of the aircraft 102.

The radar system 110A can include radar antennas 120A-C, and the radar system 110B can include radar antennas 120D-F. The radar systems 110A-B can provide a respective housing for the radar antennas 120. Moreover, the radar antennas 120 can be configured in different orientations, and can collectively provide a 360 degree radar coverage around the aircraft 102.

For example, in FIG. 1A, the radar antenna 120A in the radar system 110A is configured in a forward orientation 140 (e.g., in a horizontal orientation facing the front of the aircraft 102), the radar antenna 120B in the radar system 110A is configured in an up orientation 142 (e.g., in a vertical orientation facing up or above the aircraft 102), and the radar antenna 120C in the radar system 110A is configured in a down orientation 144 (e.g., in a vertical orientation facing down or below the aircraft 102). The radar antenna 120D in the radar system 110B is configured in a rear orientation 146 (e.g., in a horizontal orientation facing the rear or back of the aircraft 102), the radar antenna 120E in the radar system 110B is configured in a right orientation 148 (e.g., in a horizontal orientation facing to the right of the aircraft 102), and the radar antenna 120F in the radar system 110B is configured in a left orientation 150 (e.g., in a horizontal orientation facing to the left of the aircraft 102).

The number and location of radar systems (e.g., 110A-B), and the number, location, and orientation of radar antennas (e.g., 120) in FIG. 1 are non-limiting examples provided for illustration purposes. Other implementations can include a different number and/or location of radar systems and/or a different number, location, and/or orientation of radar antennas.

Figure 1B:
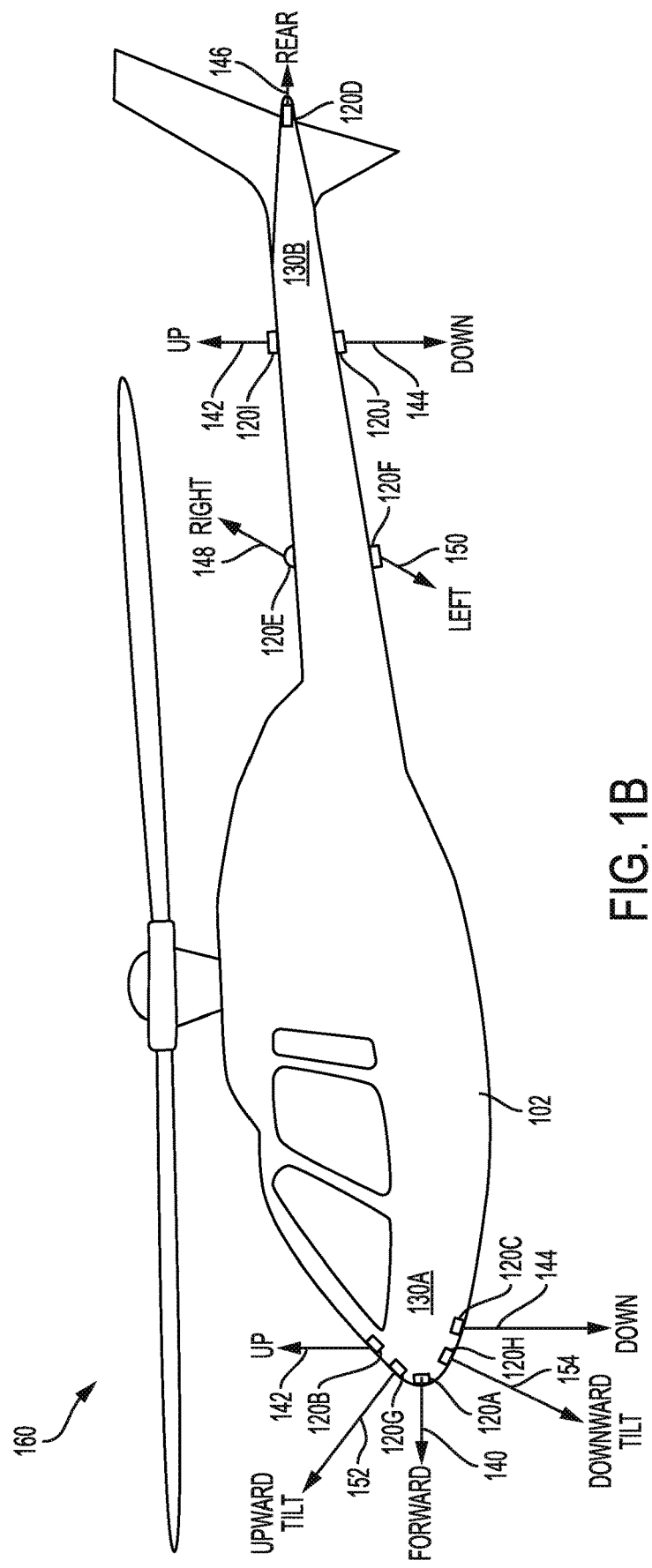
FIG. 1B illustrates an aircraft implementing radar antennas according to another example aircraft radar configuration, in accordance with various embodiments.

For example, with reference to FIG. 1B, an aircraft radar configuration 160 can include radar antennas 120A-C and 120G-H in the front area 130A of the aircraft 102, and radar antennas 120D-F and 120I-J in the rear area 130B of the aircraft 102. In this example, radar antennas 120A-C in the front area 130A of the aircraft 102 can be respectively configured in a forward orientation 140, an up orientation 142, and a down orientation 144, as previously described. Moreover, radar antenna 120G in the front area 130A of the aircraft 102 can be configured in an upward tilt orientation 152 (e.g., facing an upward diagonal plane such as a 45 degree plane), and radar antenna 120H in the front area 130A of the aircraft 102 can be configured in a downward tilt orientation 154 (e.g., facing a downward diagonal plane such as a 45 degree plane).

In addition, radar antennas 120D-F in the rear area 130B of the aircraft 102 can be respectively configured in a rear orientation 146, a right orientation 148, and a left orientation 150, as previously described. Radar antenna 120I can be an additional radar antenna configured in the up orientation 142 and located in the rear area 130B of the aircraft 102, and radar antenna 120J can be an additional radar antenna configured in the down orientation 144 and located in the rear area 130B of the aircraft 102.

The additional radar antennas (120G-J) can be implemented to provide redundancy, backup coverage, and/or extended coverage for the aircraft 102. For example, radar antennas 120G-H can provide extended coverage in the front area 130A of the aircraft 102, and radar antennas 120I-J can provide redundant, backup, and/or extended coverage in the rear area 130B of the aircraft 102.

The radar antennas 120A-J in the radar antenna configuration 160 can be part of, and/or housed in, respective radar devices. For example, radar antennas 120A-C and radar antennas 120G-H can be included in radar system 110A, shown in FIG. 1A. Moreover, radar antennas 120D-F can be included in radar system 110B, shown in FIG. 1B. In some cases, radar antennas 120I-J can also be included in radar system 110B. However, in other cases, radar antennas 120I-J can be included in one or more separate radar systems. For example, radar antenna 120I and radar antenna 120J can be included in a respective separate radar device or a single radar device that is separate from radar systems 110A and 110B.

Figure 2A:
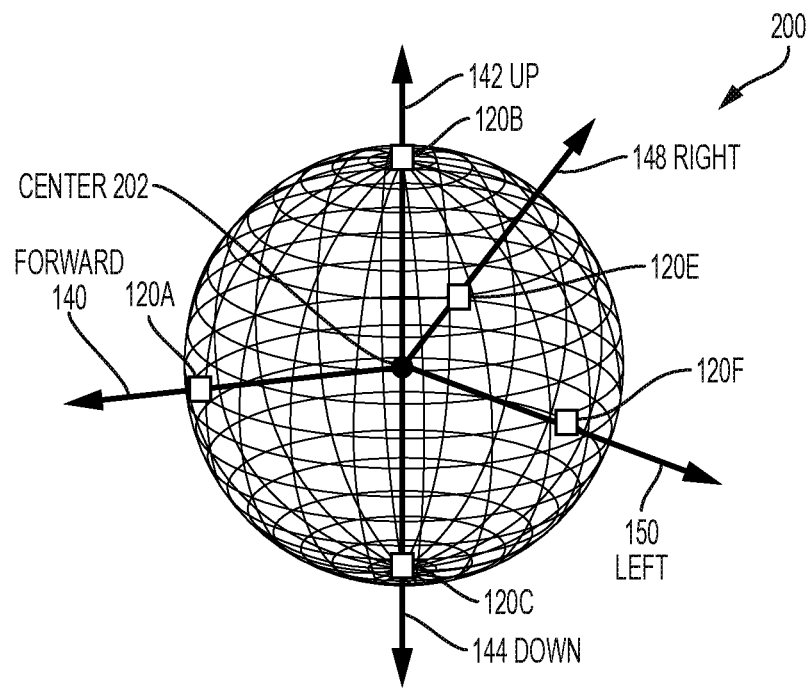
FIG. 2A illustrates an example radar antenna arrangement, in accordance with various embodiments.

FIG. 2A illustrates an example radar antenna arrangement 200. In this example, radar antenna arrangement 200 includes five radar antennas, namely, radar antennas 120A, 120B, 120C, 120E, and 120F. The five radar antennas (120A, 120B, 120C, 120E, 120F) can be included in one or more radar devices. For example, radar antennas 120A-C can be include in radar system 110A shown in FIG. 1A, and radar antennas 120E-F can be included in radar system 110B shown in FIG. 1A.

Each of the five radar antennas 120A, 120B, 120C, 120E, and 120F faces a different direction or orientation relative to a center 202 representing a zero plane/degree or longitudinal axis of an aircraft (e.g., 102). In particular, the radar antenna 120A is configured in a forward orientation 140 facing forward, the radar antenna 120B is configured in an up orientation 142 facing up, the radar antenna 120C is configured in a down orientation 144 facing down, the radar antenna 120E is configured in a right orientation 148 facing right, and the radar antenna 120F is configured in a left orientation 150 facing left. In some cases, the radar antenna 120E or the radar antenna 120F can instead be configured in a rear orientation (146) facing to the rear. In other cases, the radar antenna 148 can be configured facing a right-rear direction, and the radar antenna 150 can be configured facing a left-rear direction.

Figure 2B:
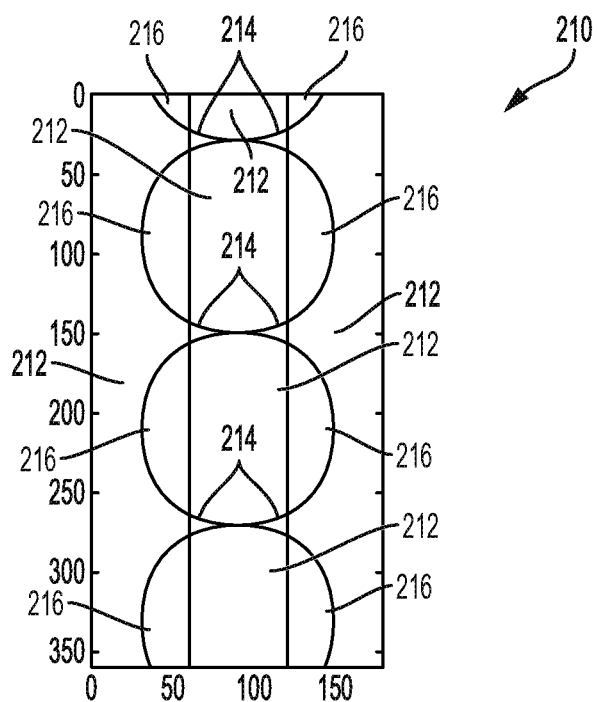
FIG. 2B illustrates an example plotted pattern of radar coverage for an example radar antenna arrangement, in accordance with various embodiments.

The radar antenna arrangement 200 can provide a 360 degree spherical coverage (or near 360 degree spherical coverage) for the aircraft (e.g., 102). For example, FIG. 2B illustrates an example plotted pattern 210 of radar coverage for the radar antenna arrangement 200. The plotted pattern 210 of radar coverage can represent uniform weights from −60 to 60 degrees off the antenna boresight, and zero weight beyond.

The areas 212 in the plotted pattern 210 represent a single antenna coverage. The areas 216 in the plotted pattern 210 represent a coverage of two radar antennas. Moreover, the areas 214 in the plotted pattern 210 represent no antenna coverage or limited antenna coverage, such as, for example, less than the 3 dB antenna beam-width of any single antenna, resulting in a reduced maximum range of detection.

Figure 3A:
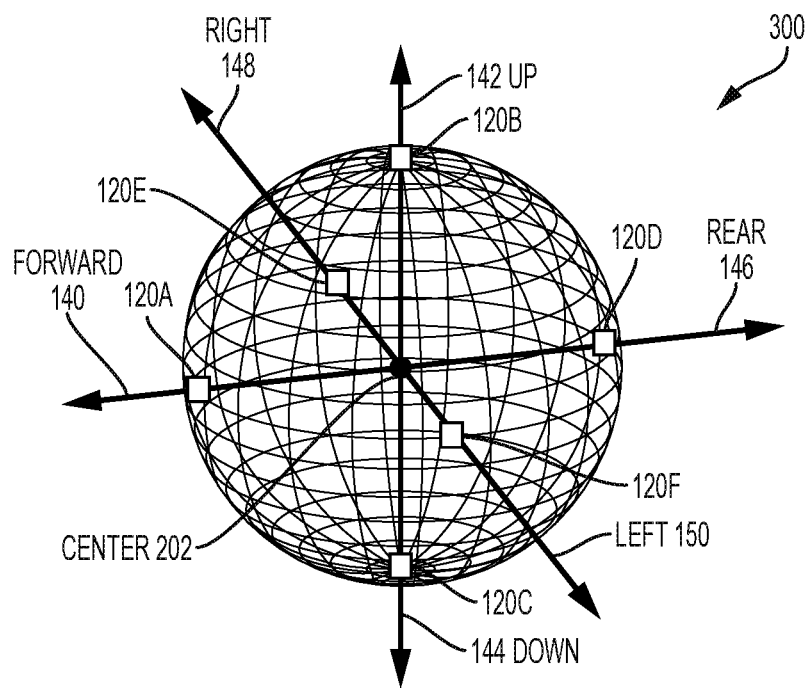
FIG. 3A illustrates another example radar antenna arrangement, in accordance with various embodiments.

FIG. 3A illustrates another example radar antenna arrangement 300. In this example, the radar antenna arrangement 300 includes six radar antennas, namely, radar antennas 120A, 120B, 120C, 120D, 120E, and 120F. The five radar antennas (120A, 120B, 120C, 120D, 120E, 120F) can be included in one or more radar devices. For example, radar antennas 120A-C can be include in radar system 110A shown in FIG. 1A, and radar antennas 120D-F can be included in radar system 110B shown in FIG. 1A.

Each of the six radar antennas 120A, 120B, 120C, 120D 120E, and 120F faces a different direction or orientation relative to the center 202 representing a zero plane/degree or longitudinal axis of an aircraft (e.g., 102). In particular, the radar antenna 120A is configured in a forward orientation 140 facing forward, the radar antenna 120B is configured in an up orientation 142 facing up, the radar antenna 120C is configured in a down orientation 144 facing down, the radar antenna 120D is configured in a rear orientation 146 facing to the rear or back of the aircraft (e.g., 102), the radar antenna 120E is configured in a right orientation 148 facing right, and the radar antenna 120F is configured in a left orientation 150 facing left.

Figure 3B:
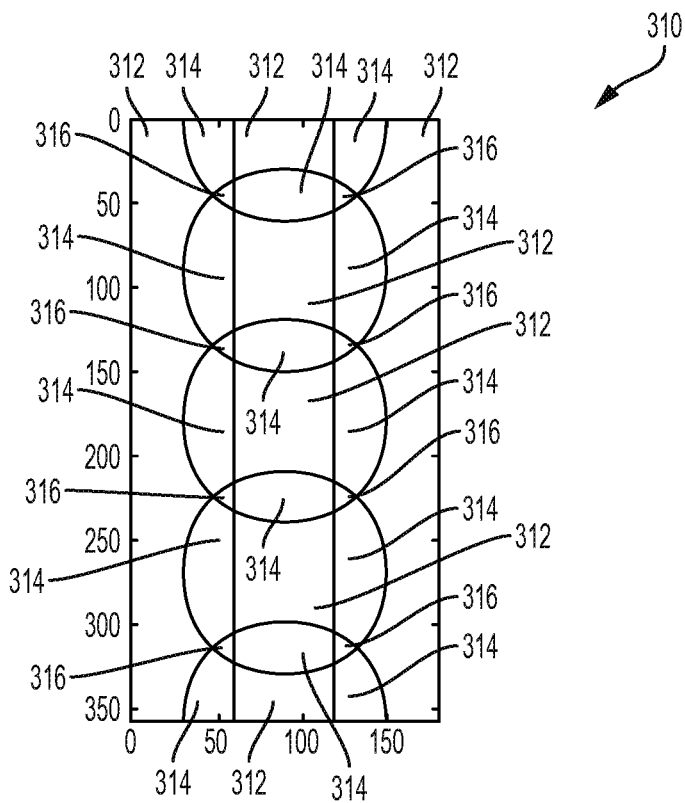
FIG. 3B illustrates another example plotted pattern of radar coverage for an example radar antenna arrangement, in accordance with various embodiments.

The radar antenna arrangement 300 can provide a 360 degree spherical coverage for the aircraft (e.g., 102). For example, FIG. 3B illustrates an example plotted pattern 310 of radar coverage for the radar antenna arrangement 300. The plotted pattern 310 of radar coverage can represent uniform weights from −60 to 60 degrees off the antenna boresight, and zero weight beyond.

The areas 312 in the plotted pattern 310 represent a single antenna coverage. The areas 314 in the plotted pattern 310 represent a coverage of two radar antennas. Moreover, the areas 316 in the plotted pattern 310 represent a coverage of three radar antennas.

Radar antennas including a front or forward facing directional component can have an increased power and antenna size. On the other hand, in some cases, radar antennas that do not include a front facing directional component can have lower power. Moreover, radar antennas including a front or forward facing directional component can have an increased accuracy, detection range, field of vision (FOV), effectiveness, etc., since an aircraft (e.g., 102) is more likely to collide with another object in front of the aircraft (e.g., because the closing rate in front of the aircraft is higher).

Figure 4A:
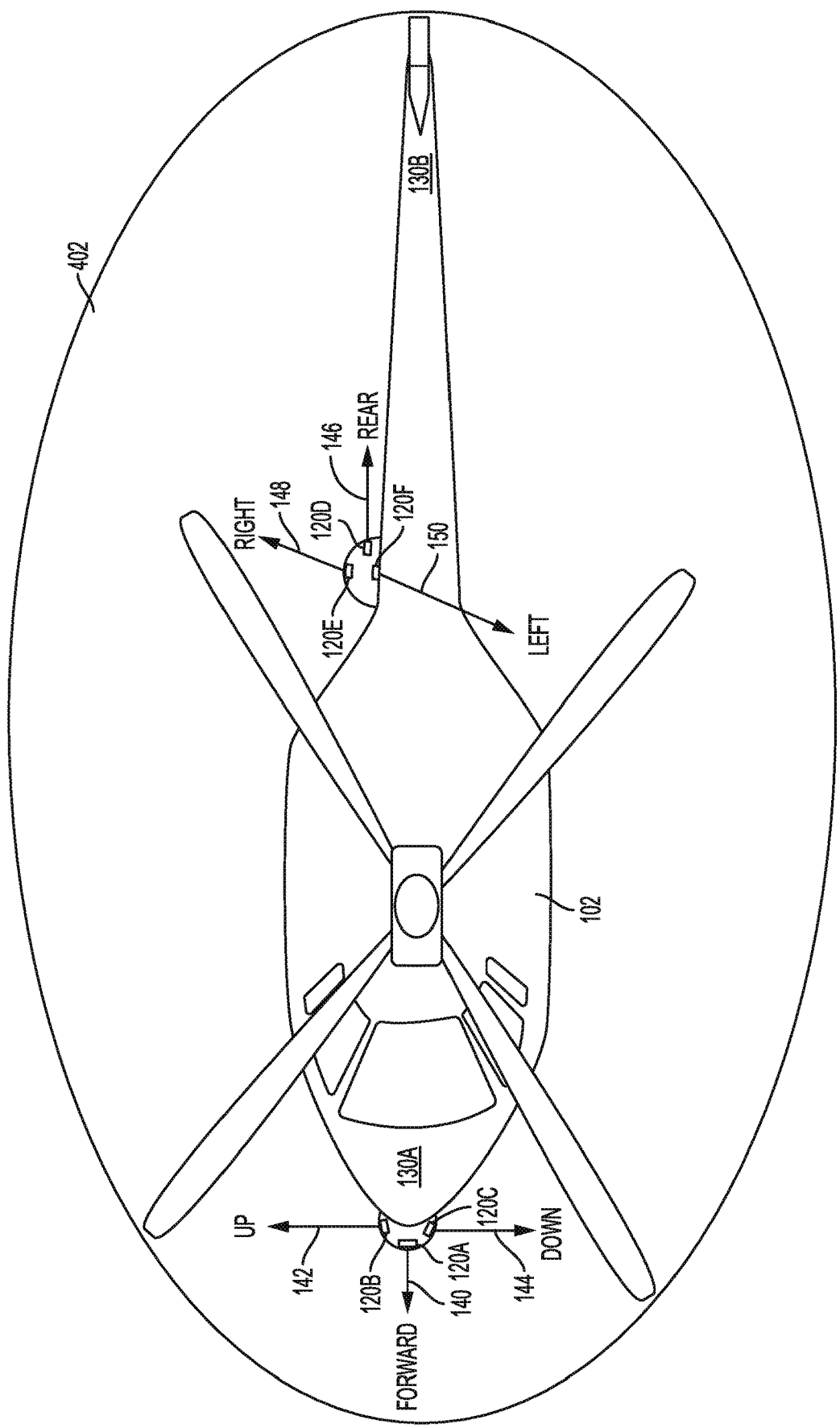
FIG. 4A illustrates a top view of an example radar coverage area for an aircraft, in accordance with various embodiments.

FIG. 4A illustrates a top view of an example radar coverage area 402 for the aircraft 102. In this example, the aircraft 102 includes the radar antennas 120A-F mounted or installed according to the example aircraft radar configuration 100 shown in FIG. 1A. For example, the radar antenna 120A is configured in a forward orientation 140, the radar antenna 120B is configured in an up orientation 142, the radar antenna 120C is configured in a down orientation 144, the radar antenna 120D is configured in a rear orientation 146, the radar antenna 120E is configured in a right orientation 148, and the radar antenna 120F is configured in a left orientation 150.

The radar coverage area 402 is a 360 degree spherical area of coverage achieved by the radar antennas 120A-F. The radar antennas 120A-F can achieve the radar coverage area 402 based on one or more factors, such as, without limitation, the number of radar antennas (e.g., six), the orientation of the radar antennas 120A-F (e.g., forward, up, down, left, right, rear), the location of the radar antennas 120A-F (e.g., front and rear), the capabilities or characteristics of the radar antennas 120A-F (e.g., range, power, gain, size, etc.), the configuration of the radar antennas 120A-F, etc.

In some implementations, the radar antennas 120A-C can be configured or designed to have a longer range than the radar antennas 120D-F. As such, in this example, the radar antennas 120A-C can detect objects at a further distance from the aircraft 102 than the radar antennas 120D-F.

Radar devices and antennas configured in accordance with the present technologies can have a relatively high update rate (e.g., >8 Hz). In some examples, radar devices and antennas configured in accordance with the present technologies can detect smaller objects (e.g., 0.1 m$^2$ RCS (Radar Cross Section) objects) at a shorter distance, such as 500 feet, and can detect larger objects (e.g., 1.0 m² RCS objects and larger) at a larger distance, such as 2000 feet.

Data from radar devices and antennas can be fused with data from other sensors residing on or off the aircraft 102. For example, data from optical cameras on the aircraft 102, data from transponders or devices such as ADS-B (Automatic dependent surveillance-broadcast) devices, data from one or more sensors, data from traffic information systems, data from laser rangefinders, and/or data from other sources can be fused to gain additional insight into airspace conditions and improve airspace visibility. Moreover, radar devices and antennas can be programmable and adjusted for specific applications.

In some aspects, a radar system or device (e.g., 110A, 110B) can include one or more transmit antennas that are electronically steerable in one or more dimensions. Transmit antennas can have variable power control for varying the range of detection and the level of power. Individual active radar systems or devices can be turned on or off to vary the resultant beam pattern. Moreover, the transmit antennas can be configured in a multi-static or bi-static configuration, for example.

In some aspects, a radar system or device (e.g., 110A, 110B) can also include one or more receive antennas that are electronically steerable in one or more dimensions. Comparing phase and/or amplitude from multiple receive antennas can be used for more acute determination of target azimuth and elevation angles. The receive antennas can be configured in a multi-static or bi-static configuration, for example.

Transmit and receive antennas can operate in Frequency Modulate Continuous Wave mode (FMCW), pulsed mode, or any other mode. Transmit and receive antennas can be steered electronically in a coordinated fashion for maximizing target detection. FMCW allows for detection of objects that are as close as the near field of the antennas. The receiver can be coherent with the transmit waveform.

A radar system or device (e.g., 110A, 110B) can implement different configurations of transmit antennas and receive antennas. For example, a radar system or device (e.g., 110A, 110B) can include a transmit antenna and multiple (n) receive antennas, multiple (m) transmit antennas and a receive antenna, or multiple (n) receive antennas and multiple (m) transmit antennas (e.g., Multiple Input, Multiple Output). In this example, n and m can represent a value greater than one. Moreover, n and m may be the same or different. Each transmitter can be coherent with one or more transmit and receive antennas to yield wide coverage areas up to and including a 360 degree spherical coverage.

In some aspects, simultaneous coordinated use of beam steering can be used to widen the field of view and digital beam forming, and thus increase angular resolution; improve range; suppress noise, clutter, jammers, etc.; and so forth. For example, a radar system or device using a transmit antenna and multiple receive antennas can accurately detect an object's angle relative to the radar system or device (e.g., based on the distance between the multiple receive antennas and received signal phase and amplitude comparisons). Antennas in a radar system or device (e.g., 110A, 110B) can be individually powered. A number of receive antennas can be used for angle detection and nulling rejection of noise, clutter, and jammers. Coordination beam steering and beam forming can be used to detect an object's angle to a significant accuracy (e.g., $\frac{1}{20}^{th}$) of an antenna's physical beam width.

Multiple radar systems or devices can be used simultaneously within overlapping spaces. In some cases, multiple radar systems or devices on the same structure, such as, for example, a vehicle or ground-based installation, can be coordinated and/or configured to cooperate with each other to surveil the same space, such as the same airspace or geographic area. Data from different radar systems or devices (e.g., data from different antennas) can be fused to create an accurate and complete radar view of the volume of airspace under surveillance.

In some examples, different radar systems or devices (e.g., radar systems 110A and/or 110B, radar antennas 120) can operate in the same space but may not be otherwise coordinated or configured to cooperate with each other. Any of a variety of different mechanisms can be used to minimize or eliminate interference between radar systems or devices. Non-limiting example mechanisms can include using Code Division Multiple Access (CDMA) across multiple radar systems or devices, using Time Divisional Multiple Access (TDMA) across multiple radar systems or devices, frequency hopping, frequency division, spread spectrum, geographic separation of radar systems or devices, aiming radar systems or devices in different directions, etc.

As previously described, various radar antennas (e.g., 120) can be mounted to an aircraft (e.g., 102). The radar antennas can face in different directions away from the aircraft. The radar antennas can use beam steering and digital being forming to provide radar coverage of at least a portion of the airspace around the aircraft, including, for example, a general direction from the aircraft (e.g., front facing conical shape), a plurality of directions from the aircraft, any portion of airspace around the aircraft up to a 360 degree spherical coverage, etc.

The radar antennas can detect objects approaching the aircraft from within the radar coverage area (e.g., 402) of the radar antennas. For example, the radar antennas can detect an intruder (e.g., a UAV, an airborne object, etc.) and determine an angle of approach for the intruder with a significant accuracy, such as, for example, with an accuracy of $\frac{1}{20}^{th}$ of a radar antenna's physical beam width.

A determined intruder angle of approach can be used as feedback for the aircraft. The determined intruder angle of approach can be passed to a collision avoidance algorithm, which can generate instructions informing an autopilot (or any other control system) of the aircraft or a pilot of the aircraft (if manned) what to do about the intruder. For example, the collision avoidance algorithm can provide instructions for avoiding the intruder (e.g., maneuvering around the intruder, changing a flight path or course of direction, etc.), determining if or when a collision avoidance action should be initiated, informing (e.g., signaling or communicating) the intruder of a potential or imminent collision, requesting help from an intruder removal system (e.g., a capturing device configured to remove the intruder by capturing the intruder, redirecting the intruder, destroying the intruder, disabling the intruder, grounding the intruder, and so forth), etc.

In some cases, radar antennas can be integrated into the collision avoidance algorithm. The ability to detect and respond to an intruder in real time (or near real time) can eliminate the need for a communication link to a remote system to obtain instructions and/or help for collision avoidance, and can reduce the associated latency of such communications and decisions.

Aircraft mounting locations for radar systems or devices can be based on one or more factors, such as, without limitation, an aircraft configuration, installation and maintenance considerations, fuselage real estate availability, line of site for a radar, a desired or required coverage area, etc. In some cases, radar antennas can be separately mounted on an aircraft (e.g., 102) and configured to provide any data generated or obtained by the radar antennas, such as object detections or measurements, to two or more separate controlling processing devices. For example, each radar antenna may be separately mounted and configured to provide data to a separate, respective controlling processing devices. Separately mounting radar antennas can provide an increased mounting flexibility and may allow further optimization of antenna Field-of-View (FOV) (e.g., to avoid occlusion).

In other examples, multiple antennas (e.g., 3 or 4) and a controlling processing device can be implemented within a single housing (e.g., radar system 110A or radar system 110B), which can be mounted to a particular location on the aircraft. Mounting a single housing containing multiple antennas may minimize an overall weight and complexity of the radar implementation and reduce installation variables.

A controlling processing device can be and/or include, for example and without limitation, any of a CPU (Central Processing Unit), a DSP (Digital Signal Processing) unit, a field-programmable gate array (FPGA), a GPU (Graphics Processing Unit), a microprocessor, a printed circuit board (PCB), a specialized processing unit, an application-specific integrated circuit (ASIC), a controller, a logic block, a processing chip, and/or any other processing component or device.

Figure 4B:
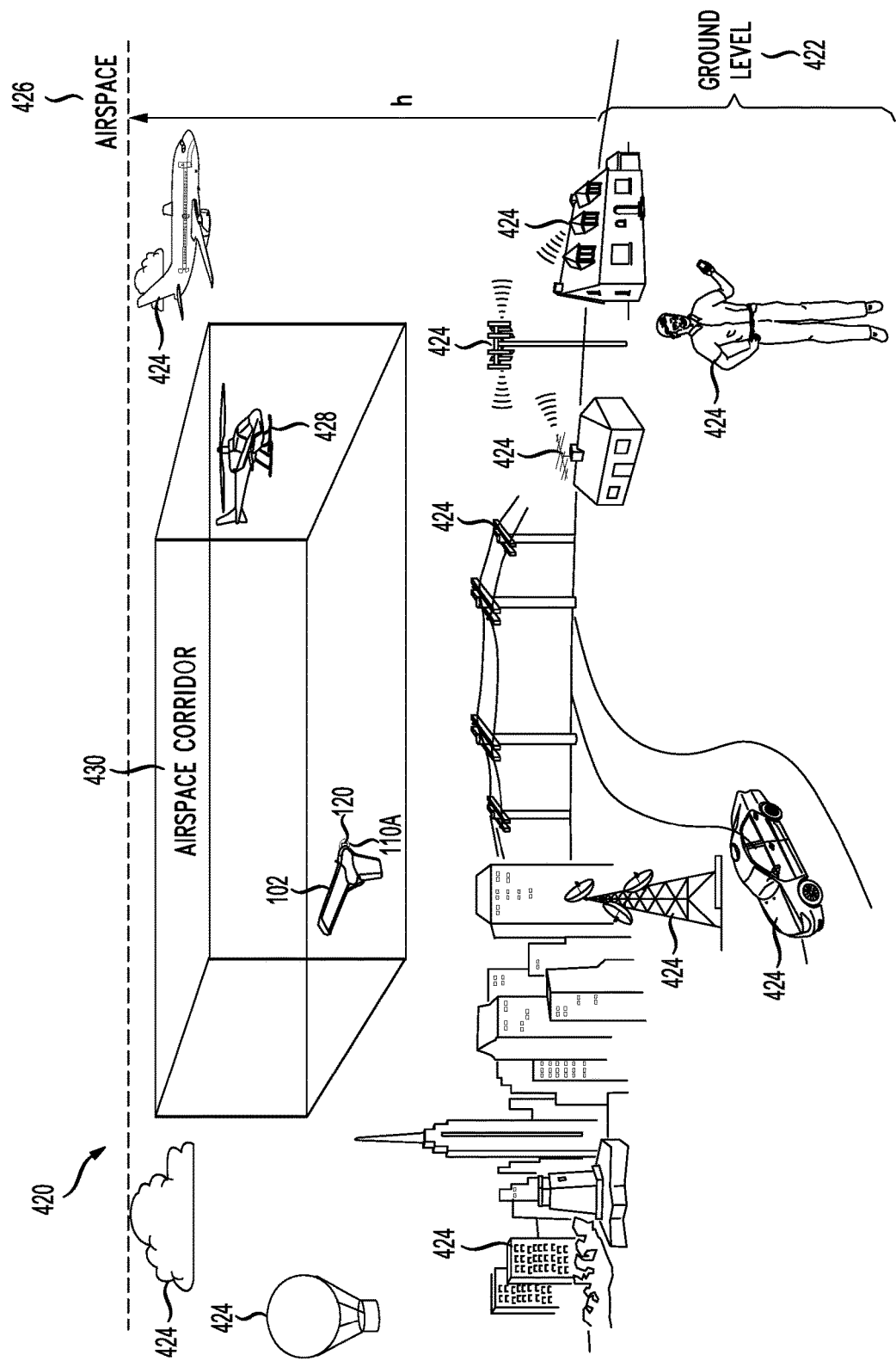
FIG. 4B illustrates a geographic area having an example airspace corridor defined for collision avoidance, in accordance with various embodiments.

FIG. 4B illustrates a geographic area 420 having an example airspace corridor 430 defined for collision avoidance. In this example, the geographic area 420 depicts example objects 424 and 428 in airspace 426 and at ground level 422. The objects 424 and 428 can be static or in motion. The objects 424 and 428 can be statically located and/or move about anywhere within ground level 422 and the airspace 426.

The objects 424 and 428 can include, without limitation, vehicles, buildings, trees, people, animals, communication towers, powerlines, geologic objects, clouds, weather elements, waves, antennas, etc. Moreover, the objects 424 and 428 can include various types of obstacles and/or vehicles at various levels of the airspace 426. For example, the airspace 426 can have various types of objects 424 and 428 located at various levels (e.g., altitudes) of the airspace 426, such as helicopters, airplanes, air balloons, air taxis, gliders, drones, birds, kites, etc.

The number, type, and/or behavior of the objects 424 and 428 in the geographic area 420 can vary at different times. For example, the number, type, and/or behavior of vehicles can vary based on the time of the day, the season, weather conditions, traffic patterns, or other conditions. To illustrate, the number of vehicles in the geographic area 420 can be greater during the day than at night, or may decrease during weather events. Such variations can increase or decrease the difficulty or danger of finding and/or avoiding objects 424 and 428 in the geographic area 420.

The airspace 426 in the geographic area 420 can include an airspace corridor 430 representing a flight corridor, skyway highway or road, airway-elevation, a flight path or volume, etc. The airspace corridor 430 can be a multi-dimensional volume in airspace 426, such as a three dimensional (3D) or two dimensional (2D) volume in airspace 426. The airspace corridor 430 can include various parameters such as a length, a width, an elevation, one or more boundaries, shape parameters or characteristics, etc.

The airspace corridor 430 can be calculated based on various factors such as, without limitation, the radar coverage area (e.g., 402) of an aircraft (e.g., 102); one or more calculations or results obtained from radar systems and/or antennas (e.g., 110A and/or 120) configured on the aircraft (e.g., 102); intelligence received from one or more sources, such as ground radars or lasers, other aircrafts, GPS systems, flight controllers, servers, cameras, laser rangefinders, sensors, human sources, etc.; predictive algorithms; reports and/or notifications identifying objects (e.g., 424, 428) in the airspace 426 and associated characteristics (e.g., elevation, speed, direction or trajectory, shape, size, etc.); and/or any other data.

The airspace corridor 430 can be used by an aircraft (e.g., 102) for collision avoidance. For example, the airspace corridor 430 can provide a perimeter, airspace zone or volume, and/or geographic (GEO) fence defining a safe space for travel (e.g., a corridor, skyway highway, etc.) for an aircraft (e.g., 102). When an object is detected within the airspace corridor 430, the aircraft (e.g., 102) can initiate a collision avoidance and/or object awareness mode to track the object and, if necessary, perform a collision avoidance action such as capturing or redirecting the object, maneuvering around the object, and/or otherwise avoiding a collision with the object.

For example, in FIG. 4B, aircraft 102 is within the airspace corridor 430 and object 428 is also within the airspace corridor 430. The aircraft 102 can detect the presence of the object 428 in the airspace corridor 430 using, for example, the radars 120. Since the airspace corridor 430 can represent a safe zone for flight by the aircraft 102, the existence of the object 428 in the airspace corridor 430 can present a risk, threat or danger of collision to the aircraft 102. Accordingly, the existence of the object 428 in the airspace corridor 430 can trigger the aircraft 102 to initiate a collision avoidance and/or tracking mode to maintain track of the object 428 and, if necessary, perform a collision avoidance action to avoid colliding with the object 428.

In some cases, the airspace corridor 430 can be assigned a transmission code to represent the airspace corridor 430. The transmission code can be transmitted by aircrafts to broadcast their presence in the airspace corridor 430 and/or any other surveillance information relevant to the airspace corridor 430. Such transmissions can be performed using, for example, ADS-B (Automatic dependent surveillance-broadcast) or the like. In some examples, an aircraft (e.g., 102) can treat the entire airspace corridor 430 or a portion thereof as they would treat a single object 424, 428, such as an aircraft, and thus execute the aircraft's avoidance algorithm(s) to avoid a collision or to make any flight or collision adjustments when a collision is imminent.

Objects such as aircrafts (e.g., UAVs) that leave the airspace corridor 430 can be ticked, labeled, and/or tracked for safety and avoidance of future collision risks. In some cases, objects such as aircrafts (e.g., UAVs) that leave the airspace corridor 430 can be labeled, assigned, and/or set with a "proxy" transmission code, such as an ADS-b code or the like, that an aircraft (e.g., 102) and/or radar system or antennas (e.g., 110A and/or 120) can transmit to surrounding aircrafts to inform the surrounding aircrafts of such objects and allow the surrounding aircrafts to execute their ACAS (Airborne Collision Avoidance System) and/or TCAS (Traffic Alert and Collision Avoidance System) avoidance measures. This mechanism provides the "missing" link between ADS-b ACAS/TCAS systems and UTM (Unmanned Traffic Management) systems and does not tax the bandwidth or frequency of ADS-b.

Within the airspace corridor 430, objects such as aircrafts can be spaced with specific object avoidance parameters. If there is a high probability that an object such as an aircraft is going to run into a transmission code (e.g., ADS-B) emitting corridor (airspace corridor 430), an aircraft (e.g., 102) and/or radar system (e.g., 110A, 120) aware of the impending collision because it is listening to the transmission code (e.g., ADS-B) associated with the airspace corridor (e.g., 430) and/or because it has a radar system (e.g., 110A, 120) on board, can transmit a command to other aircrafts in the area (e.g., in the airspace corridor 430, the geographic area 420, and/or a surrounding area) to execute a collision avoidance action, such as hovering and creating a space for the object (e.g, an aircraft) to enter and exit the airspace corridor 430 without colliding with other objects.

While FIG. 4B depicts a single airspace corridor (430), it should be noted that one or more geographic areas can include more than one airspace corridor. For example, in some cases, the geographic area 420 can include multiple airspace corridors covering different airspace volumes. Such airspace volumes (i.e, airspace corridors) can have the same or different shapes, sizes (e.g., length, width, coverage area, etc.), elevation, configuration, etc., and can be represented by different, respective transmission codes (e.g., ADS-B codes). Moreover, in some cases, an airspace corridor (e.g., 430) can be static or dynamic, meaning its configuration (e.g., shape, size, elevation, characteristics, etc.) can be static or may change based on one or more factors, such as object and/or location information or updates (e.g., object detection information, object location information, object tracking information, traffic detection or prediction information, etc.).

In some cases, to manage traffic, avoid collisions, and protect against bad actors, the configuration (e.g., size, shape, elevation, characteristics, etc.) of an airspace corridor (e.g., 430) can be calculated and/or adjusted based on object location and/or detection information; machine learning (ML) or artificial intelligence (AI) algorithms for identifying and/or predicting objects, movement patterns, collision avoidance parameters, etc.; and/or other intelligence sources or algorithms. Moreover, to manage traffic and avoid collisions, messages can be transmitted to aircrafts instructing the aircrafts to move from one corridor (or portion of a corridor) to another to avoid collisions or as part of a traffic management strategy.

If there is a traffic jam in an airspace corridor (e.g., 430), the airspace corridor can be adjusted by, for example, expanding the airspace corridor to include one or more additional traffic lanes or areas, add another level (e.g., another lane or area at a different location or altitude), shrink a neighboring corridor, expand the corridor to include a portion of one or more neighboring corridors, merge with one or more corridors, etc.

Figure 5A:
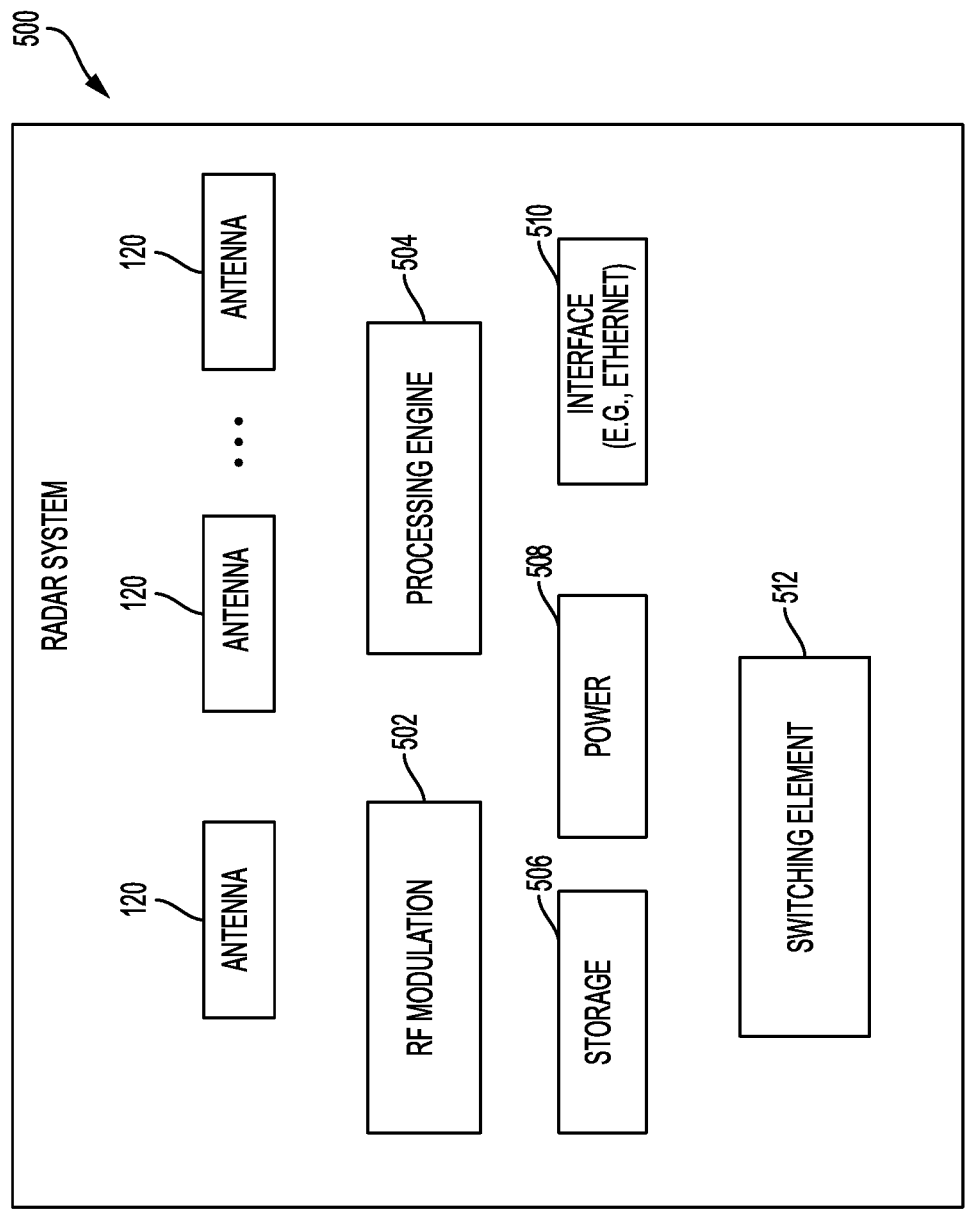
FIG. 5A illustrates an example architecture of a radar system, in accordance with various embodiments.

FIG. 5A illustrates an example architecture 100 of a radar system (e.g., radar system 110A and/or radar system 110B). In this example, the architecture 100 of the radar system includes antennas 120 (e.g., radar antennas 120A-C or radar antennas 120D-F). The radar antennas 120 can include one or more receive antennas and/or one or more transmit antennas. For example, the radar antennas 120 can include a plurality of receive antennas and a plurality of transmit antennas, a plurality of receive antennas and a single transmit antenna, a single receive antenna and a single transmit antenna, or a single receive antenna and a plurality of transmit antennas. Moreover, in some cases, the receive antennas can be monostatic or bistatic antennas, for example.

The architecture 100 of the radar system can include RF (radio frequency) modulation service 502, which can include one or more RF modulator and/or channeling elements. The RF modulation service 502 can perform heat dissipation, RF channel isolation, mechanical vibration reduction, wave propagation, RF modulation (e.g., convert RF signals to a specific format such as a digital format), etc.

The architecture 100 of the radar system can include a processing engine 504. The processing engine 504 can be powered by one or more processing devices. The one or more processing devices can be or include, for example and without limitation, any of a CPU, a DSP, an FPGA, a GPU, a microprocessor, a PCB, a specialized processing unit, an ASIC, a controller, a logic block, a processing chip, and/or any other processor, processing component or device. The one or more processing devices can also include other types of electronic circuits and/or components, such as a cache.

The processing engine 106 can execute operations for the compact radar system 100. Non-limiting example operations which can be performed by the processing engine 504 can include signal processing, management and/or control operations (e.g., controlling components and operations in the radar system, device management, operational management), data collection and processing (e.g., collecting and/or processing data from the antennas 120 and/or any other components such as sensors, laser rangefinders, cameras, etc.), collision avoidance operations, object detection operations, calculations, monitoring operations, filtering operations, data fusing operations, machine learning operations, notification functions, error detection, and/or other processing functions.

The architecture 100 of the radar system can include storage 506 for storing data and information such as measurements, notifications, events, instructions, messages, statistics, outputs, inputs, processed data, raw data, logs, software, etc. The storage 506 can include one or more storage devices, such as storage disks, flash memories, cache, etc.

The architecture 100 of the radar system can also include a power element 508 for powering components in the radar system. The power element 508 can include a power storage such as a battery, a power source (e.g., a power supply, an external power source, etc.), and the like. In some cases, the power element 508 can include a power switching element to switch power signals from a power origin component to a power destination component.

The architecture 100 of the radar system can include an interface 510, such as an Ethernet interface or a wireless interface (e.g., cellular interface, WIFI interface, etc.). The interface 510 can process digital signals and data, and communicate digital signals with other components or device (internal and/or external).

The architecture 100 of the radar system can also include a switching element 512, such as an Ethernet switch. The switching element 512 can switch signals to and from the different antennas 120 in the radar system. The switching element 512 can also switch signals to and from other components or device in the radar system, such as, for example, power element 508, interface 510, etc.

Figure 5B:
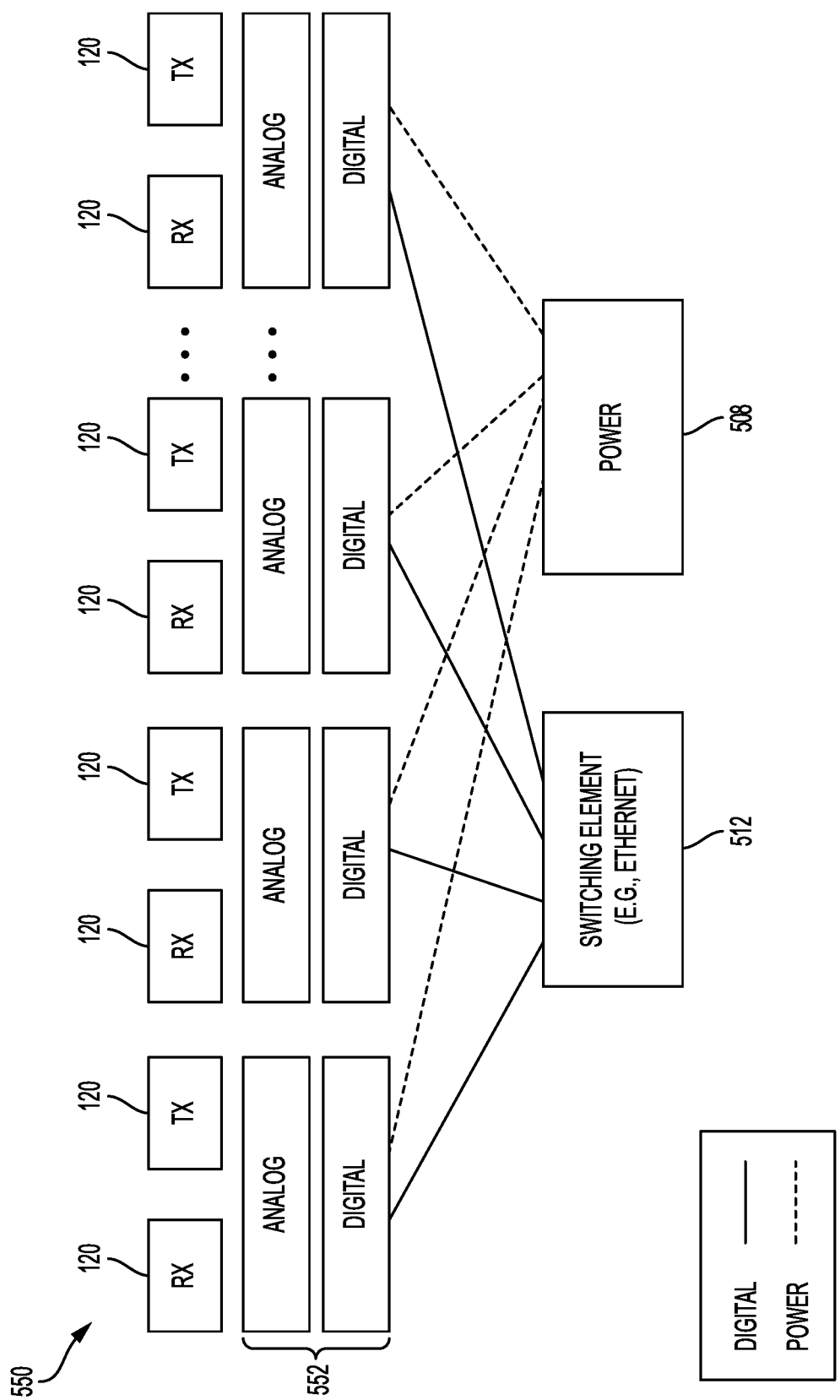
FIG. 5B illustrates an example signal switching configuration which can be implemented by components in an example radar system, in accordance with various embodiments.

FIG. 5B illustrates an example signal switching 550 configuration which can be implemented by components in the example architecture 100 shown in FIG. 5A. In this example, signals to and from the antennas 120 can be converted into a specific format (e.g., analog, digital, etc.) in an RF modulation layer 552. RF signals to and from the antennas 120 can be routed to the appropriate destination by the switch element 512. In some cases, power signals can be separately routed or switched by the power element 508.

Figure 6:
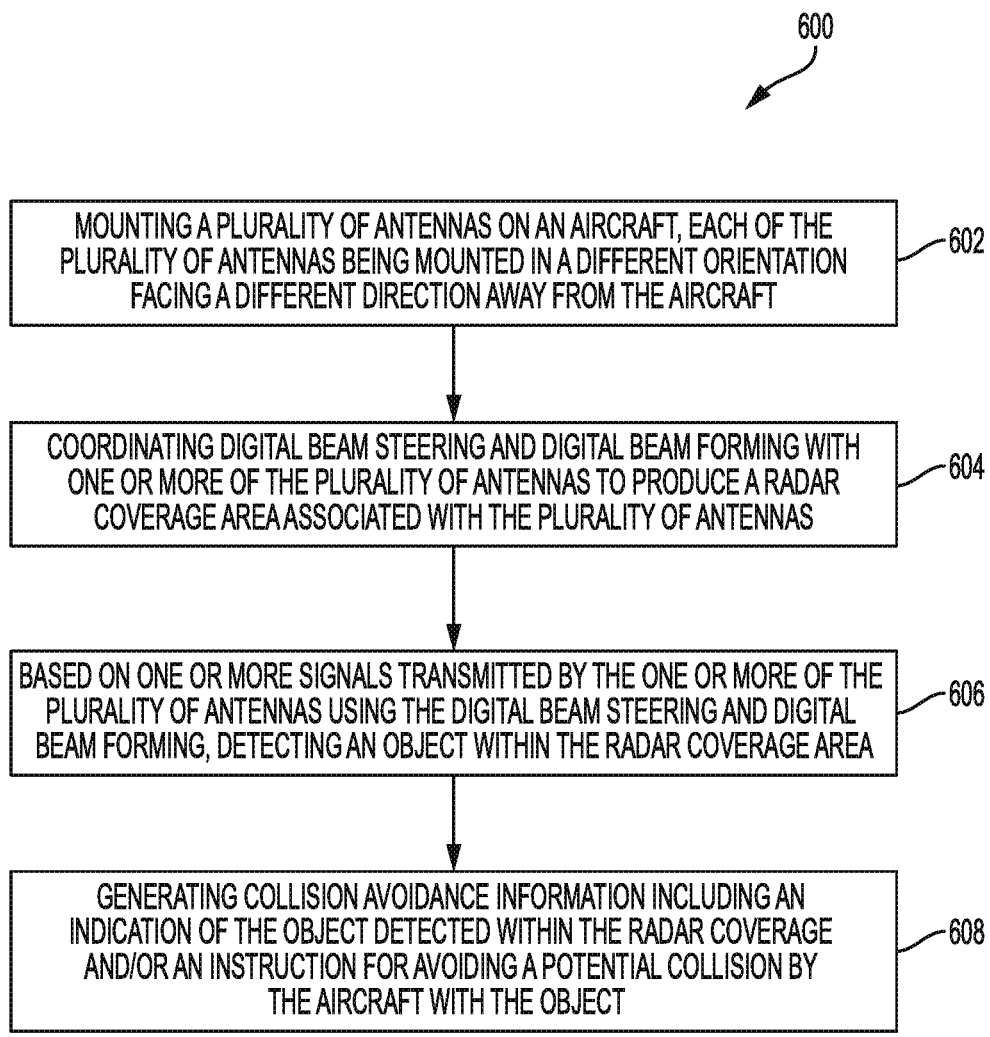
FIG. 6 illustrates an example method for using radars for collision avoidance, in accordance with various embodiments.
Figure 7:
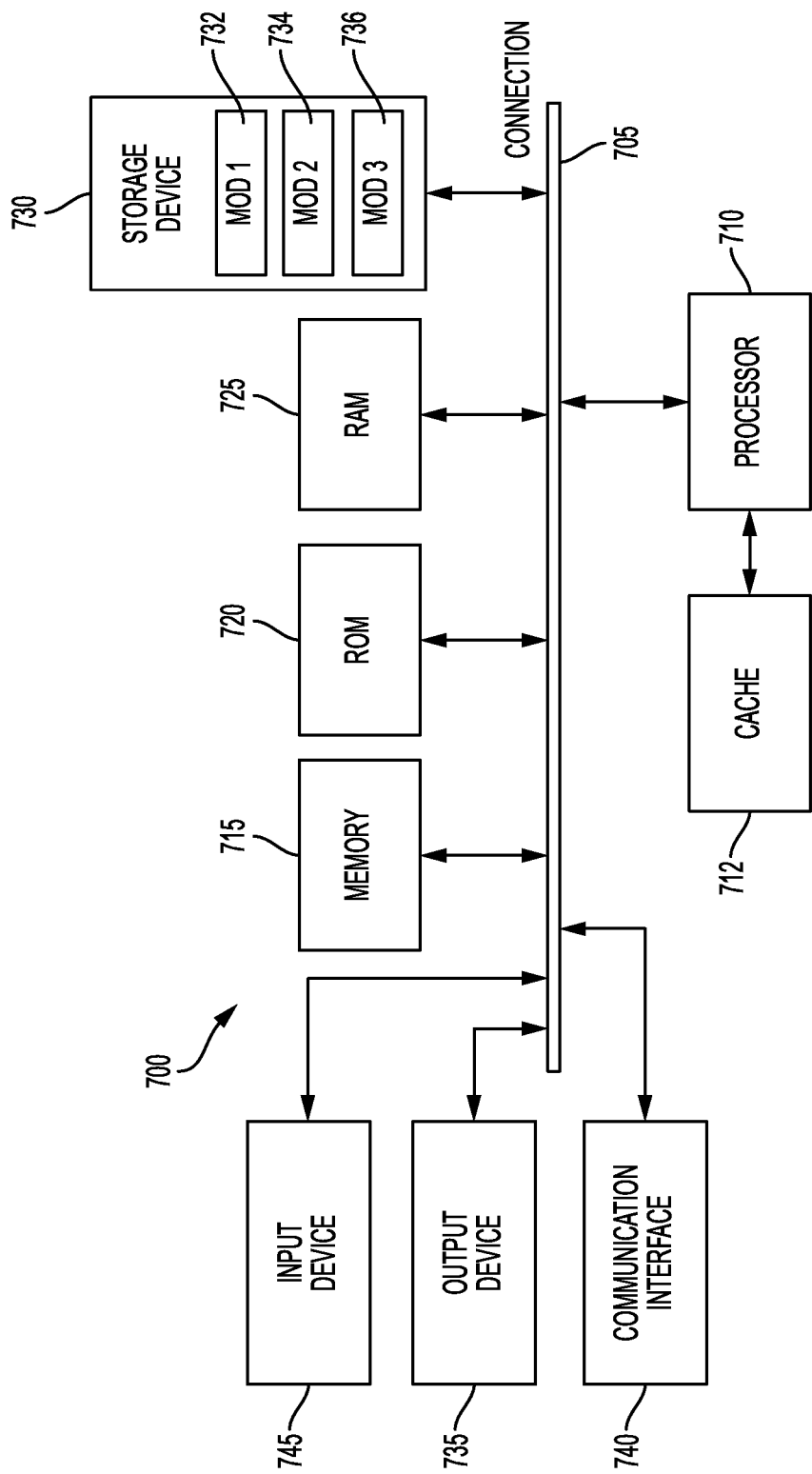
FIG. 7 illustrates an example computer system architecture of a computing device which can be used to implement computing operations in accordance with various embodiments.

Having disclosed example system components and concepts, the disclosure now turns to the example method 600 for using radars for collision avoidance, as shown in FIG. 6. For the sake of clarity, the method 600 is described with reference to the aircraft 102 and radar antennas 120, as variously shown in FIGS. 1A through 5B. The steps outlined herein are examples and can be implemented in any combination thereof, including combinations that exclude, add, or modify certain steps.

At step 602, the method can involve mounting a plurality of antennas (120) on an aircraft (102), each of the plurality of antennas (120) being mounted in a different orientation (e.g., 140, 142, 144, 146, 148, 150, 152, and/or 154) facing a different direction away from the aircraft (102). The plurality of antennas (120) can be mounted and/or oriented on some or all axes of the aircraft (102).

For example, radar antennas 120A-C can be mounted on a front area 130A of the aircraft 102 and radar antennas 120D-F can be mounted on a rear area 130B of the aircraft 102, with the radar antennas 120A-F being mounted in a forward orientation 140, an up orientation 142, a down orientation 144, a rear orientation 146, a right orientation 148, and a left orientation 150. In some cases, some or all of the radar antennas 120A-C mounted on the front area 130A can have an increased maximum detection range relative to other radar antennas, an increased power, and/or a larger antenna size relative to other radar antennas.

Moreover, in some cases, at least some of the plurality of antennas (120) can include a directional component facing in a forward direction and/or a traveling direction. The traveling direction can be a direction in which the aircraft is traveling. In some cases, such antennas can provide radar coverage in an area in front of the aircraft (102). For example, such antennas can provide a conically shaped radar coverage area in front of the aircraft (102).

In some example configurations, the plurality of antennas (120) can include 5 antennas. In other example configurations, the plurality of antennas (120) can include 6 antennas. In yet other example configurations, the plurality of antennas (120) can include less than 5 or more than 6 antennas.

In some cases, the plurality of antennas (120) or a portion of the plurality of antennas (120) can be housed within one or more radar systems (e.g., 110A and/or 110B). For example, one portion of antennas can be housed in a radar system (e.g., 110A) mounted on a front area (e.g., 130A) of the aircraft (102), and another portion of antennas can be housed in another radar system (e.g., 110B) mounted on a rear area (e.g., 130B) of the aircraft (102). In other examples, various portions of the antennas can be housed in one or more radar systems mounted or located on other areas of the aircraft (102).

The one or more radar systems can include various components and configurations, such as the components and configurations shown in FIGS. 5A-B. For example, a radar system can include one or more processing elements, one or more storage devices, one or more power elements, one or more interfaces, one or more switching elements, one or more RF modulation elements, and/or any other electrical component or configuration.

At step 604, the method can involve coordinating digital beam steering and digital beam forming with one or more of the plurality of antennas (120) to produce a radar coverage area (e.g., 402) associated with the plurality of antennas (120). The radar coverage area can include, for example, a portion of an airspace around the aircraft (102). In some implementations, the radar coverage area can be a 360 degree spherical radar coverage area around the aircraft (102).

At step 606, the method can involve detecting, based on one or more signals transmitted by the plurality of antennas (120) using the digital beam steering and digital beam forming, one or more objects within the radar coverage area. The one or more objects can include, for example, other aircrafts (e.g., manned and/or unmanned aircrafts), animals (e.g., birds), hot air balloons, gliders, airborne objects, buildings, mountains, etc.

At step 608, the method can involve generating collision avoidance information including an indication of the one or more objects detected within the radar coverage area and/or an instruction for avoiding a potential collision by the aircraft with the one or more objects. For example, the collision avoidance information can identify the one or more objects detected within the radar coverage area and/or other information about the one or more objects, such as a location, a velocity, a trajectory or direction, an elevation, a size, a pattern of movement or activity, a time of detection, etc. The aircraft (102) can use this information to track the one or more objects, avoid the one or more objects, remove the one or more objects, make communication contact with the one or more objects, etc.

As another example, the collision avoidance information can include instructions that the aircraft (102) can use to avoid colliding with the one or more objects. To illustrate, the collision avoidance information can include instructions for changing a path or trajectory of the aircraft (102) to avoid colliding with the one or more objects. The instructions can specify, for example, a path, a velocity, an altitude, a maneuvering strategy, a trajectory, a change in one or more traveling parameters, etc., which the aircraft (102) can implement to avoid a collision with the one or more objects.

In some cases, the method can involve providing the collision avoidance information to an operator of the aircraft (102) if the aircraft is manned, and/or a control system of the aircraft (102), such as an autopilot system (e.g., if the aircraft is unmanned). For example, a radar system housing and/or in connection with the plurality of antennas can transmit the collision avoidance information to a control system in the aircraft (102) and/or a computing device that can provide the information to an operator of the aircraft. The computing device in this example can provide the information to the operator via, for example, an audio notification (e.g., via a speaker device), a visual notification (e.g., via a user interface), a text notification (e.g., an electronic message such as a text message, text presented on a display device, etc.), and so forth.

In some cases, the plurality of antennas (120) can include a set (e.g., one or more) of receive antennas. Moreover, the method can further include obtaining, using the set of receive antennas, one or more return signals associated with an intruder (e.g., an object such as an aircraft or an animal) in the radar coverage area. The one or more return signals can be one or more signals reflected from the intruder. For example, one or more radar signals can be transmitted by one or more antennas and reflected back from the intruder.

The method can also involve determining, based on the one or more return signals, data about the intruder, such as an angle of the intruder, a proximity or range of the intruder, a range rate of the intruder, a radar return magnitude, a location of the intruder, a characteristic of the intruder (e.g., a size or shape), a vector of the intruder, etc. The method can then process, based on the data about the intruder, one or more location parameters associated with the intruder, such as an angle of the intruder, using a collision avoidance algorithm to generate a collision avoidance result. The collision avoidance algorithm can be, for example, a software algorithm and/or a machine learning algorithm. In some cases, the method can use the set of receive antennas to identify and/or reject clutter signals, interfering signals, and/or other signals.

In some cases, the method can involve receiving detection data from the plurality of antennas (120), and fusing the detection data together. For example, a radar system (e.g., 110A, 110B) and/or a computer device (e.g., a processor, a computer system, a control system, etc.) can receive the detection data and fuse the data together to generate a more detailed and/or accurate view of the conditions, information, environment, objects, etc., reported and/or described in the detection data. The detection data can include, for example, an indication of one or more objects detected using the plurality of antennas (120), one or more characteristics (e.g., shape, size, velocity, direction, altitude, etc.) of the one or more objects detected, one or more conditions (e.g., environment conditions, activity, etc.) detected, etc.

In some cases, the method can involve calculating an airspace corridor (e.g., 430) for managing airspace traffic and/or managing collision avoidance operations. The airspace corridor can include a multi-dimensional volume (e.g., 2D volume, 3D volume, etc.) in airspace. The airspace corridor can have a specific (static or dynamic) configuration, such as a shape, size (e.g., length, width, etc.), elevation, etc. The airspace corridor can be assigned and/or represented by a particular transmission code, such as an ADS-B code or the like. Aircrafts in or around the airspace corridor can use the transmission code to receive or report information associated with the airspace corridor, such as objects detected within the airspace corridor or approaching the airspace corridor, for example.

The airspace corridor can be used to assist traffic management and collision avoidance operations in the airspace. For example, if an object, such as an aircraft, is detected within the airspace corridor (or approaching the airspace corridor), the presence of the object within the airspace corridor (or approaching the airspace corridor) can be used as a trigger to notify nearby, surrounding aircrafts and/or aircrafts within the airspace corridor of the object and execute or initiate a collision avoidance actions, such as a maneuver to avoid colliding with the object or make room for the object to allow the object exit the airspace corridor safely.

For example, in some cases, the detecting of an object at step 606 of the method and/or the generating of collision avoidance information at step 608 of the method can be at least partly based on (or in consideration of) an airspace corridor associated with the aircraft (102). To illustrate, the aircraft (102) may be flying, approaching, and/or assigned to fly within an airspace corridor (430). If at step 606, the object is detected to be flying within or approaching the airspace corridor (430), such detection can trigger the generation of the collision avoidance information at step 608 and/or can be used as a factor (e.g., a trigger, a collision avoidance parameters, a collision probability, etc.) in generating the collision avoidance information at step 608.

The collision avoidance information in this example can identify the airspace corridor (e.g., via a transmission code associated with the airspace corridor), indicate that the object is within or approaching the airspace corridor, and/or provide one or more parameters or instructions for avoiding a potential collision with the object. For example, the collision avoidance information can include an instruction for the aircraft (102) to move (e.g., adjust its flight path) or maneuver to avoid colliding with the object or provide space for the object to exist the airspace corridor safely. In some cases, the collision avoidance information can also include instructions for adjusting the configuration of the airspace corridor (e.g., the shape, the size, etc.) to avoid a collision and/or improve traffic management.

For example, the collision avoidance information can include instructions for expanding the airspace corridor, adding space from one or more neighboring airspace corridors, merging with one or more airspace corridors, adding one or more lanes (e.g., one or more horizontal and/or vertical planes for traffic), etc., which can provide additional space for objects in airspace and thus reduce collision risks, traffic congestion, etc.

The disclosure now turns to FIG. 7, which illustrates an example computing system architecture 700 including various hardware components which can be implemented in a radar system and/or a computing device, such as a computer system on an aircraft (e.g., 102), and which can be configured to perform various computing operations, such as detection and/or collision avoidance operations as described herein.

In this example, the computing system architecture 700 includes components in electrical communication with each other using a connection 705, such as a bus. The computing system architecture 700 includes a processing unit (CPU or processor) 710 and a system connection 705 that couples various system components including the system memory 715, such as read only memory (ROM) 720 and random access memory (RAM) 725, to the processor 710. The computing system architecture 700 can include a cache of high-speed memory connected directly with, in close proximity to, or integrated as part of the processor 710. The computing system architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing system architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with a computing device configured according to the computing system architecture 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A radar system comprising:
    a plurality of antennas mounted on an aircraft, each of the plurality of antennas having a different orientation facing a different direction away from the aircraft;
    one or more processing devices; and
    at least one computer-readable storage medium having stored therein instructions which, when executed by the one or more processing devices, cause the radar system to:
        coordinate digital beam steering and digital beam forming with one or more of the plurality of antennas to produce a radar coverage area associated with the plurality of antennas, the radar coverage area comprising at least a portion of an airspace around the aircraft;
        based on one or more signals transmitted by the one or more of the plurality of antennas using the digital beam steering and digital beam forming, detect one or more objects within the radar coverage area;
        determining, based on coordinating the digital beam steering and digital beam forming, a respective angle of the one or more objects relative to the radar system; and
        generate, based on the respective angle of the one or more objects relative to the radar system, collision avoidance information comprising at least one of an indication of the one or more objects detected within the radar coverage area and an instruction for avoiding a potential collision by the aircraft with the one or more objects.

2. The radar system of claim 1, wherein at least one of the plurality of antennas includes a directional component facing in at least one of a forward direction and a traveling direction, the traveling direction comprising a direction in which the aircraft is traveling, and wherein the radar coverage area comprises an area in front of the aircraft.

3. The radar system of claim 2, wherein the at least one of the plurality of antennas provides a shaped radar coverage area in front of the aircraft.

4. The radar system of claim 2, the at least one of the plurality of antennas having at least one of an increased maximum detection range relative to at least some of an additional plurality of antennas mounted on the aircraft, an increased power, and a larger antenna size relative to other antennas in at least one of the plurality of antennas and the additional plurality of antennas.

5. The radar system of claim 1, wherein the plurality of antennas comprises at least one of five antennas and six antennas.

6. The radar system of claim 1, wherein the plurality of antennas comprises a set of receive antennas, wherein the set of receive antennas are configured to receive one or more return signals associated with an intruder in the radar coverage area, the at least one computer-readable storage medium having stored therein instructions which, when executed by the one or more processing devices, cause the radar system to:

based on the one or more return signals, determine an angle of the intruder, relative to the radar system, in the radar coverage area.

7. The radar system of claim 6, the at least one computer-readable storage medium having stored therein instructions which, when executed by the one or more processing devices, cause the radar system to:

process at least one of the angle of the intruder relative to the radar system, a range, a range rate, a radar return magnitude, or a vector of the intruder using a collision avoidance algorithm to generate a collision avoidance result.

8. The radar system of claim 1, the at least one computer-readable storage medium having stored therein instructions which, when executed by the one or more processing devices, cause the radar system to:

receive detection data from the plurality of antennas; and fuse the detection data together.

9. The radar system of claim 1, wherein the radar coverage area comprises a 360 degree spherical radar coverage area around the aircraft.

10. The radar system of claim 1, wherein the plurality of antennas comprises a set of receive antennas, the at least one computer-readable storage medium having stored therein instructions which, when executed by the one or more processing devices, cause the radar system to:

reject, using the set of receive antennas, at least one of clutter signals and interfering signals.

11. A method comprising:

mounting a plurality of antennas on an aircraft, each of the plurality of antennas being mounted in a different orientation facing a different direction away from the aircraft;

coordinating digital beam steering and digital beam forming with one or more of the plurality of antennas to produce a radar coverage area associated with the plurality of antennas, the radar coverage area comprising at least a portion of an airspace around the aircraft;

based on one or more signals transmitted by the one or more of the plurality of antennas using the digital beam steering and digital beam forming, detecting one or more objects within the radar coverage area;

determining, based on coordinating the digital beam steering and digital beam forming, an angle of the one or more objects relative to the aircraft; and generating collision avoidance information comprising at least one of the angle of the one or more objects, an indication of the one or more objects detected within the radar coverage area and an instruction for avoiding a potential collision by the aircraft with the one or more objects.

12. The method of claim 11, wherein at least one of the plurality of antennas includes a directional component facing in at least one of a forward direction and a traveling direction, the traveling direction comprising a direction in which the aircraft is traveling, and wherein the radar coverage area comprises an area in front of the aircraft.

13. The method of claim 12, wherein the at least one of the plurality of antennas provides a shaped radar coverage area in front of the aircraft.

14. The method of claim 12, further comprising;

mounting an additional plurality of antennas on the aircraft, each of the additional plurality of antennas being mounted in another different orientation facing another different direction away from the aircraft, and wherein the at least one of the plurality of antennas has at least one of an increased maximum detection range relative to at least some of the additional plurality of antennas, an increased power, and a larger antenna size relative to other antennas in at least one of the plurality of antennas and the additional plurality of antennas.

15. The method of claim 11, wherein the plurality of antennas comprises at least one of five antennas and six antennas, and wherein the radar coverage area comprises a 360 degree spherical radar coverage area around the aircraft.

16. The method of claim 11, wherein the plurality of antennas comprises a set of receive antennas, the method further comprising:

obtaining, using the set of receive antennas, one or more return signals associated with an intruder in the radar coverage area;

based on the one or more return signals, determining at least one of the angle of the one or more objects relative to the aircraft, a range, a range rate, a radar return magnitude, or a vector of the intruder in the radar coverage area; and processing at least one of the angle, the range, the range rate, the radar return magnitude, or the vector of the intruder using a collision avoidance algorithm to generate a collision avoidance result.

17. The method of claim 11, further comprising:

receiving detection data from the plurality of antennas; and fusing the detection data together.

18. The method of claim 11, wherein the plurality of antennas comprises a set of receive antennas, the method further comprising:

rejecting, using the set of receive antennas, at least one of clutter signals and interfering signals.

19. A non-transitory computer-readable storage medium having stored therein instructions which, when executed by one or more radar systems, cause the one or more radar systems to:

coordinate digital beam steering and digital beam forming with one or more of a plurality of antennas to produce a radar coverage area associated with the plurality of antennas, the plurality of antennas being mounted on an aircraft, each of the plurality of antennas having a different orientation facing a different direction away from the aircraft, wherein the radar coverage area comprises at least a portion of an airspace around the aircraft;

based on one or more signals transmitted by the one or more of the plurality of antennas using the digital beam steering and digital beam forming, receive one or more return signals reflected by an object in the radar coverage area;

based on the one or more return signals, detect the object in the radar coverage area;

based on the one or more return signals and based on coordinating the digital beam steering and digital beam forming, determining an angle of the object relative to the one or more radar systems; and generate collision avoidance information comprising at least one of an indication of the object detected within the radar coverage area and an instruction for avoiding a potential collision by the aircraft with the object.

20. The non-transitory computer-readable storage medium of claim 19, wherein at least one of the plurality of antennas includes a directional component facing in at least one of a forward direction and a traveling direction, the traveling direction comprising a direction in which the aircraft is traveling, wherein the radar coverage area comprises a 360 degree spherical radar coverage area around the aircraft, and wherein the at least one of the plurality of antennas has at least one of an increased maximum detection range relative to an additional plurality of antennas mounted on the aircraft, an increased power, and a larger antenna size relative to other antennas in at least one of the plurality of antennas and the additional plurality of antennas.

\* \* \* \* \*